United States Patent
Noma

(10) Patent No.: US 8,626,938 B2
(45) Date of Patent: Jan. 7, 2014

(54) SERVICE PROVIDING APPARATUS AND METHOD, AND INFORMATION PROCESSING APPARATUS STORAGE MEDIUM

(75) Inventor: Tsunetake Noma, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/302,171

(22) Filed: Dec. 14, 2005

(65) Prior Publication Data

US 2006/0095512 A1    May 4, 2006

Related U.S. Application Data

(62) Division of application No. 09/864,063, filed on Oct. 6, 2000.

(30) Foreign Application Priority Data

Oct. 15, 1999    (JP) .................................... 11-293327

(51) Int. Cl.
   *G06F 15/16*    (2006.01)
(52) U.S. Cl.
   USPC ........... 709/231; 709/204; 709/205; 709/206; 709/217
(58) Field of Classification Search
   USPC ........... 709/200, 201, 204, 205, 218; 705/26, 705/51, 26.1; 713/200
   See application file for complete search history.

(56) References Cited

U.S. PATENT DOCUMENTS

| | | | |
|---|---|---|---|
| 5,157,643 A | * | 10/1992 | Suzuki .......................... 369/30.3 |
| 5,583,993 A | * | 12/1996 | Foster et al. .................. 709/205 |
| 5,956,482 A | * | 9/1999 | Agraharam et al. .......... 709/203 |
| 6,047,288 A | | 4/2000 | Kurosawa et al. |
| 6,144,991 A | * | 11/2000 | England ........................ 709/205 |

(Continued)

FOREIGN PATENT DOCUMENTS

| | | |
|---|---|---|
| JP | 7-79221 | 3/1995 |
| JP | 7-222126 | 8/1995 |

(Continued)

OTHER PUBLICATIONS

"Introduction of peer-to-peer LAN in a small office", LAN to begin with by three people, monthly publication Cybiz Soho computing, Cybiz Co., Ltd., vol. 4, No. 8, Aug. 1, 1999, 15 pages.

(Continued)

*Primary Examiner* — Krisna Lim
*Assistant Examiner* — Margishi Desai
(74) *Attorney, Agent, or Firm* — Oblon, Spivak, McClelland, Maier & Neustadt, L.L.P.

(57) ABSTRACT

The invention provides a service providing apparatus and method and an information processing apparatus and method as well as a program storage medium by which a plurality of users can communicate with each other simultaneously. A plurality of client computers are connected to a shared server over a network and log in a common chat room of a chat system. If a user of one of those of the client computers which are in a group requests for reproduction of a predetermined tune, then the instruction is transmitted to the shared server over the network. The shared server receives the instruction transmitted thereto and reads out music data of the request stored in a music database therein, and transmits the music data to the client computers of the group.

28 Claims, 12 Drawing Sheets

(56) References Cited

U.S. PATENT DOCUMENTS

| | | | |
|---|---|---|---|
| 6,175,872 B1 | 1/2001 | Neumann et al. | |
| 6,560,707 B2 | 5/2003 | Curtis et al. | |
| 6,564,260 B1 | 5/2003 | Baber et al. | |
| 6,567,851 B1 | 5/2003 | Kobayashi | |
| 6,587,127 B1* | 7/2003 | Leeke et al. | 715/765 |
| 6,598,074 B1 | 7/2003 | Moller et al. | |
| 6,675,299 B2* | 1/2004 | Porter et al. | 726/26 |
| 6,728,784 B1* | 4/2004 | Mattaway | 709/245 |
| 6,750,881 B1* | 6/2004 | Appelman | 715/733 |
| 6,832,380 B1* | 12/2004 | Lau et al. | 719/328 |
| 6,842,903 B1* | 1/2005 | Weschler | 719/328 |
| 6,868,403 B1* | 3/2005 | Wiser et al. | 705/51 |
| 7,043,529 B1* | 5/2006 | Simonoff | 709/205 |
| 7,046,689 B2* | 5/2006 | Burns et al. | 370/429 |
| 7,209,892 B1* | 4/2007 | Galuten et al. | 705/26 |
| 7,730,132 B2* | 6/2010 | Ludwig et al. | 709/204 |
| 2002/0010826 A1* | 1/2002 | Takahashi et al. | 711/100 |
| 2002/0065926 A1* | 5/2002 | Hackney et al. | 709/231 |
| 2002/0091771 A1* | 7/2002 | Agraharam et al. | 709/205 |
| 2002/0184513 A1* | 12/2002 | Hori et al. | 713/193 |
| 2003/0078941 A1* | 4/2003 | Kawakami et al. | 707/104.1 |
| 2003/0093474 A1 | 5/2003 | Kakuta et al. | |
| 2003/0110132 A1* | 6/2003 | Sako | 705/51 |
| 2003/0212744 A1* | 11/2003 | Dunlap et al. | 709/204 |
| 2004/0032680 A1* | 2/2004 | Fujiwara | 360/15 |
| 2004/0199525 A1* | 10/2004 | Matsuda et al. | 707/100 |
| 2004/0199574 A1* | 10/2004 | Franco et al. | 709/201 |
| 2004/0236788 A1* | 11/2004 | Sato et al. | 707/104.1 |
| 2005/0027795 A1 | 2/2005 | San Andres et al. | |
| 2005/0027871 A1* | 2/2005 | Bradley et al. | 709/227 |
| 2005/0289635 A1* | 12/2005 | Nakamura et al. | 725/134 |
| 2006/0080030 A1* | 4/2006 | Okude et al. | 701/208 |
| 2007/0208735 A1* | 9/2007 | Matsuda et al. | 707/5 |
| 2007/0276740 A1* | 11/2007 | Hunter et al. | 705/26 |
| 2008/0072156 A1* | 3/2008 | Sitrick | 715/733 |
| 2008/0239888 A1* | 10/2008 | Kotani et al. | 369/30.08 |
| 2008/0303959 A1* | 12/2008 | Mears et al. | 348/731 |
| 2009/0299968 A1* | 12/2009 | Green et al. | 707/3 |
| 2011/0246771 A1* | 10/2011 | Kashi | 713/168 |

FOREIGN PATENT DOCUMENTS

| | | |
|---|---|---|
| JP | 10-334051 | 12/1998 |
| JP | 11-161588 | 6/1999 |
| JP | 11-242545 | 9/1999 |

OTHER PUBLICATIONS

Office Action issued Nov. 30, 2010, in Japan Patent Application No. 2010-091683 (with English-language Translation).

Office Action issued Aug. 9, 2011 in Japanese Patent Application No. 2000-310016 filed Oct. 11, 2000.

* cited by examiner

F I G. 12
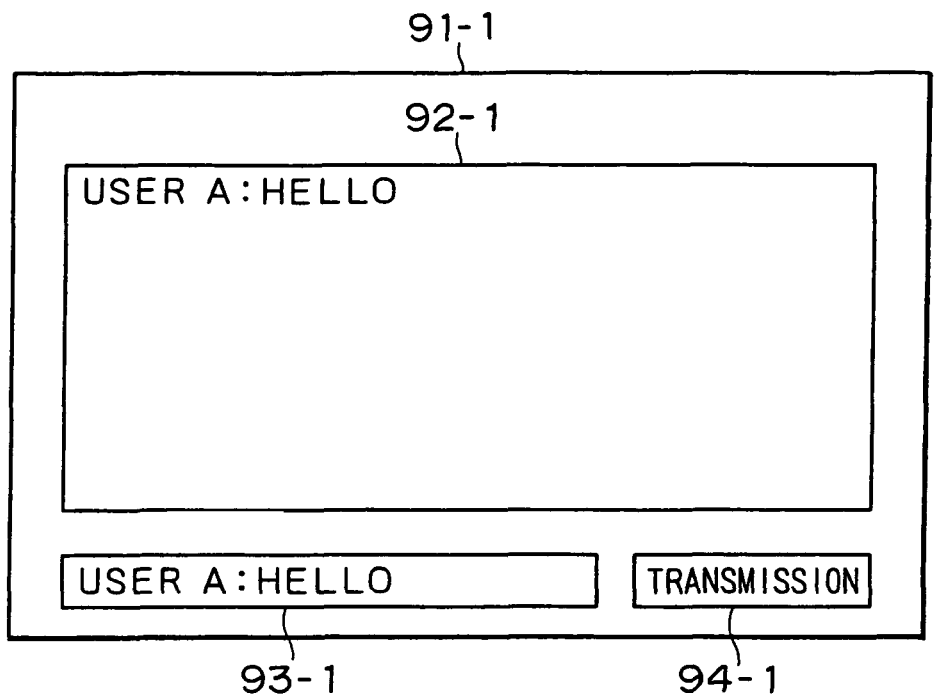
F I G. 13
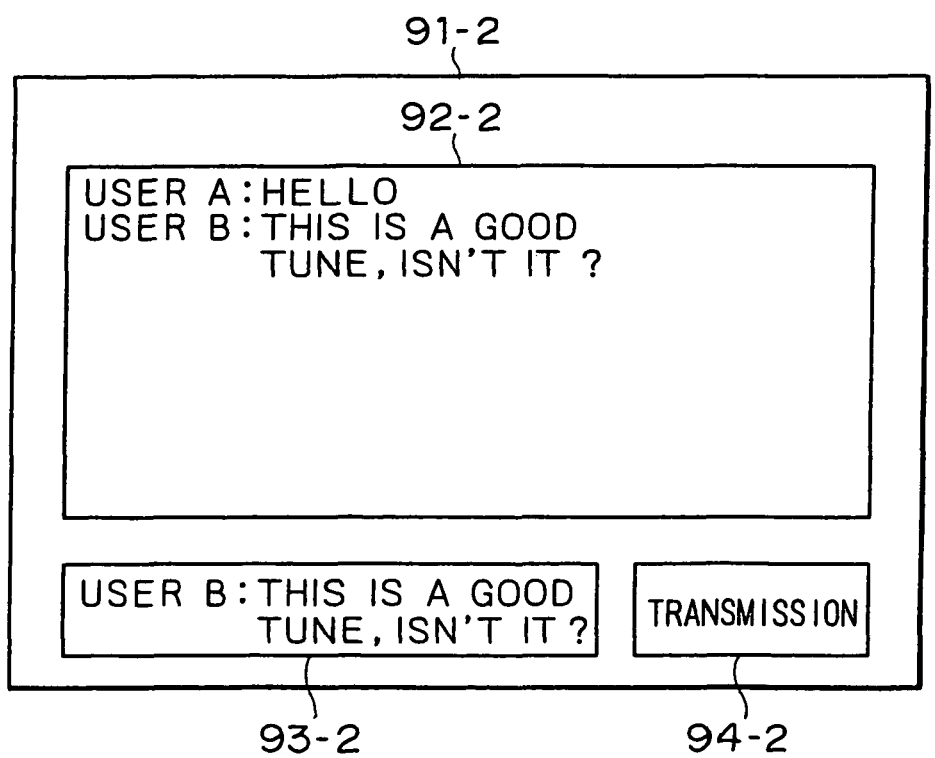

F I G. 14
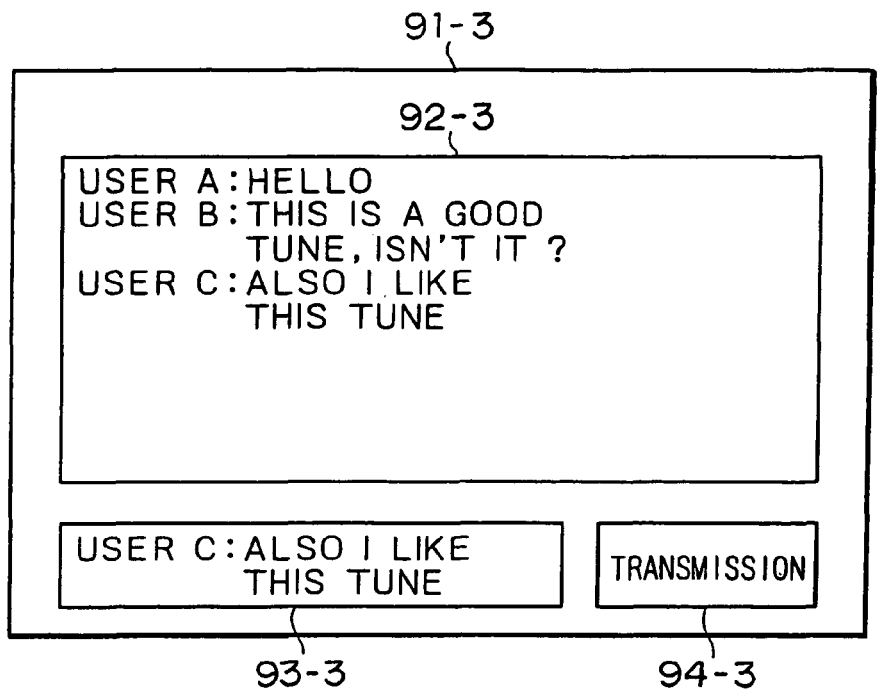
F I G. 15
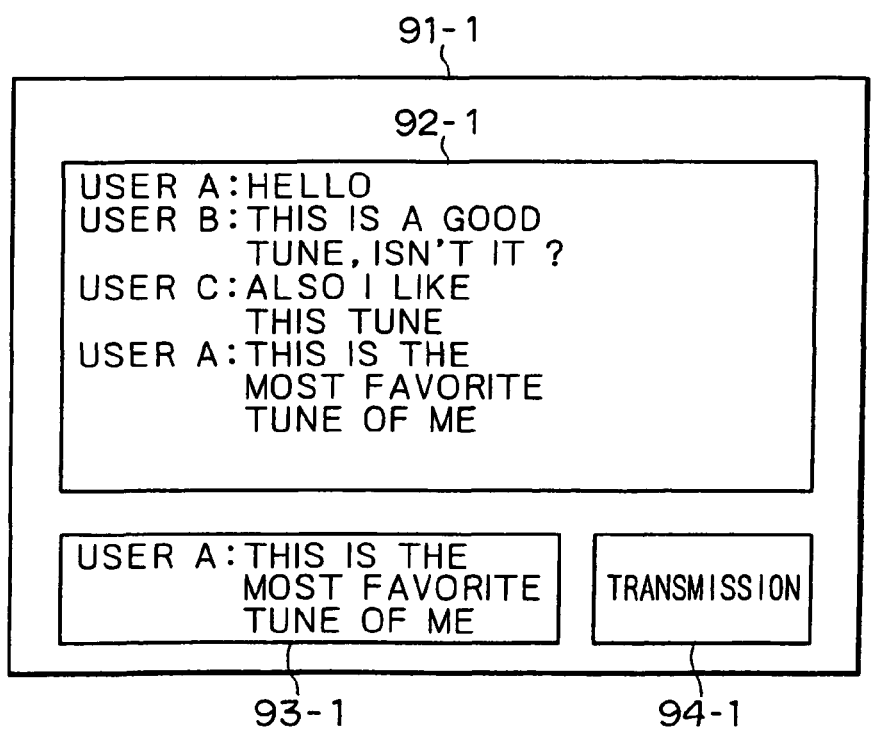

SERVICE PROVIDING APPARATUS AND METHOD, AND INFORMATION PROCESSING APPARATUS STORAGE MEDIUM

CROSS-REFERENCE TO RELATED APPLICATIONS

This application is a divisional of U.S. application Ser. No. 09/684,063, filed Oct. 6, 2000, and is based upon and claims the benefit of priority from the prior Japanese Patent Application No. P11-293327 filed on Oct. 15, 1999, the entire contents of each of which are incorporated herein by reference.

BACKGROUND OF THE INVENTION

This invention relates to a service providing apparatus and method, and an information processing apparatus and method as well as a program storage medium, and more particularly to a service providing apparatus and method, and an information processing apparatus and method as well as a program storage medium by which the same program data can be reproduced simultaneously by a plurality of users making use of, for example, a chat system.

A chat system is available as a service provided by the Internet. In the chat system, text data transmitted from a certain client who logs in a server are received by the server once and then transmitted to other clients who log in the server. Consequently, a plurality of users who are at remote places can communicate readily with each other.

However, the conventional chat system permits a plurality of users to share only texts (characters) inputted by the individual users and thus has a subject to be solved in that it provides poorer presence than where a plurality of users gather and communicate with each other in a room in a real space.

SUMMARY OF THE INVENTION

It is an object of the present invention to provide a service providing apparatus and method, and an information processing apparatus and method as well as a program storage medium by which a plurality of users can communicate with each other with abundant variations and presence.

In order to attain the object described above, according to an aspect of the present invention, there is provided a service providing apparatus for providing a service to a plurality of information processing apparatus on a network, comprising storage means for storing a group to which some of the information processing apparatus belong, reception means for receiving request information transmitted from any of the information processing apparatus, acquisition means for acquiring data coordinated with the request information, and communication means for transmitting the data acquired by the acquisition means simultaneously to those of the information processing apparatus which belong to the same group.

The data may be music data, and the request information may include a tune of particular music data.

The service providing apparatus may further comprise transmission means for receiving text data transmitted from any of the information processing apparatus and transmitting the text data to the other information processing apparatus which belong to the same group.

According to another aspect of the present invention, there is provided a service providing method for a service providing apparatus for providing a service to a plurality of information processing apparatus on a network, comprising a storage controlling step of controlling so that a group to which some of the information processing apparatus belong is stored, a reception step of receiving request information transmitted from any of the information processing apparatus, an acquisition step of acquiring data coordinated with the request information, and a communication step of transmitting the data acquired by the processing of the acquisition step simultaneously to those of the information processing apparatus which belong to the same group.

According to a further aspect of the present invention, there is provided a program storage medium on which a computer-readable program for providing a service to a plurality of information processing apparatus on an network is stored, the program comprising a storage controlling step of controlling so that a group to which some of the information processing apparatus belong is stored, a reception step of receiving request information transmitted from any of the information processing apparatus, an acquisition step of acquiring data coordinated with the request information, and a communication step of transmitting the data acquired by the processing of the acquisition step simultaneously to those of the information processing apparatus which belong to the same group.

With the service providing apparatus, the information providing method and the program of the program storage medium, request information transmitted from any of the information processing apparatus is received, and data coordinated with the request information are acquired. Then, the acquired data are transmitted simultaneously to the plurality of information processing apparatus which belong to the same group. Consequently, data of a request from any of the information processing apparatus of one group can be simultaneously shared by the plurality of information processing apparatus of the group.

According to a still further aspect of the present invention, there is provided an information processing apparatus for accessing a service providing apparatus, which provides services on a network, together with other information processing apparatus on the same network and enjoying the services of the service providing apparatus, comprising inputting means for inputting access information for accessing the service providing apparatus, display control means for controlling display of contents of the services transmitted from the service providing apparatus, requesting means for selecting a predetermined service from among the services and requesting the service providing apparatus for transmission of the selected service to the information processing apparatus and the other information processing apparatus, reception means for receiving data transmitted from the service providing apparatus, and reproduction means for reproducing the data.

The services may be table information of the data to be provided from the service providing apparatus, and the data may be music data.

According to a yet further aspect of the present invention, there is provided an information processing method for an information processing apparatus for accessing a service providing apparatus, which provides services on a network, together with other information processing apparatus on the same network and enjoying the services of the service providing apparatus, comprising an inputting step of inputting access information for accessing the service providing apparatus, a display controlling step of controlling display of contents of the services transmitted from the service providing apparatus, a requesting step of selecting a predetermined service from among the services and requesting the service providing apparatus for transmission of the selected service to the information processing apparatus and the other information processing apparatus, a reception step of receiving data transmitted from the service providing apparatus, and a reproduction step of reproducing the data.

According to a yet further aspect of the present invention, there is provided a program storage medium on which a computer-readable program for causing an information processing apparatus to access a service providing apparatus, which provides services on a network, together with other information processing apparatus on the same network and enjoy the services of the service providing apparatus is stored, the program comprising an inputting step of inputting access information for accessing the service providing apparatus, a display controlling step of controlling display of contents of the services transmitted from the service providing apparatus, a requesting step of selecting a predetermined service from among the services and requesting the service providing apparatus for transmission of the selected service to the information processing apparatus and the other information processing apparatus, a reception step of receiving data transmitted from the service providing apparatus, and a reproduction step of reproducing the data.

With the information processing apparatus, the information processing method and the program of the program storage medium, contents of services transmitted from the service providing apparatus are displayed, and a predetermined service is selected from among the services. Then, a request for transmission of the selected service to the information processing apparatus and the other information processing apparatus which belong to the same group is transmitted to the service providing apparatus. Consequently, the data of the request can be shared with certainty by the information processing apparatus and the other information processing apparatus.

According to yet another further aspect of the invention there is provided a content data sharing system having a plurality of devices operably linked to a network. Each device includes a storage unit that stores shared content data, a communication unit that transmits an item list of the shared content data to one of other devices determined as being currently connected to the network and eligible for content data sharing, and receives a request for the shared content data corresponding to an item selected from the item list of the shared content data from the one of the other devices. Also included in each device is a control unit that controls the communication unit to stream the shared content data requested from the one of the other devices. In addition, the communication unit receives an other item list of the shared content data from one of the other devices, transmits the request for the shared content data corresponding to an item selected from the other item list of the shared content data to one of the other devices, and receives the shared content data streamed from one of the other devices. Further, each device of the plurality of devices further includes a display unit that displays the other item list of the shared content data and a device list of the other devices determined as being currently connected to the network and eligible for content data sharing. Each device of the plurality of devices further comprises a reproducing control unit that controls reproducing of the shared content data while the communication unit is receiving the shared content data, and the eligible other devices belong to a predetermined group operably linked to the network.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 12 to 14 are schematic views showing different chat windows on different client computers; and FIG. 15 is a schematic view showing a different display in the chat window shown in FIG. 12.

DESCRIPTION OF THE PREFERRED EMBODIMENT

Figure 1:
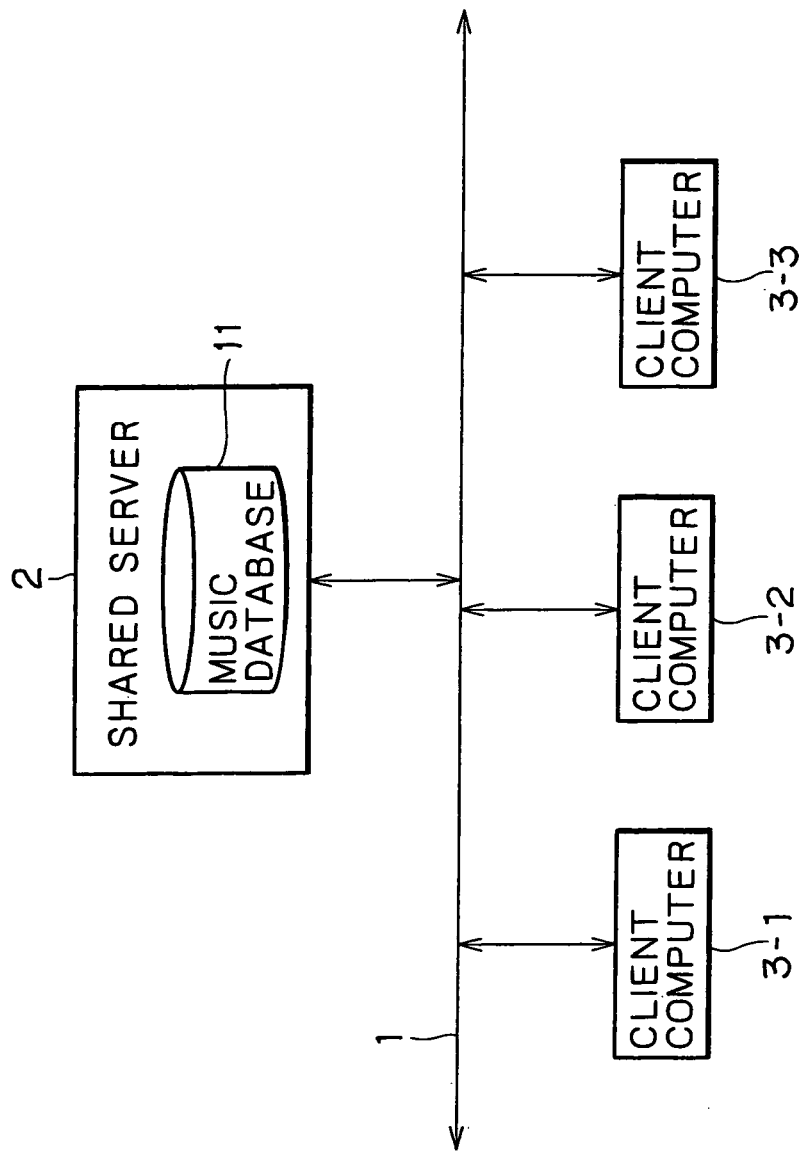
FIG. 1 is a block diagram showing a construction of a chat system to which the present invention is applied.

Referring to FIG. 1, there is shown a chat system to which the present invention is applied. The chat system is principally composed of clients who perform text chatting and a chat server and allows real time chatting and downloading of music data of a jukebox in the chart server.

More particularly, the chat system shown includes a single shared server 2 which includes a jukebox and has a function for chatting, and three client computers 3-1 to 3-3, all connected to each other over a network 1 such as the Internet.

The shared server 2 is formed from, for example, a work station or a personal computer and functions as a chat server by executing a chat server program to provide a chat environment so that the client computers 3-1 to 3-3 can perform a chat among them. The shared server 2 functions also as a jukebox server by executing a music data transmission program so that music data requested by any of the client computers 3-1 to 3-3 are read out from a music database 11 and provided to the client computers 3-1 to 3-3.

Each of the client computers 3-1 to 3-3 (in the description below, where there is no necessity to distinguish the client computers 3-1 to 3-3 from one another, they are or each of them is referred to simply as client computers 3 or client computer 3) stores therein a chat client program for performing a chat while a chat space provided by the shared server 2 is shared with the other client computers. Thus, by execution of the chat client program and execution of the chat server program by the shared server 2, a chat space for performing a chat (details are hereinafter described with reference to FIG. 12) is displayed on the client computer 3.

The client computer 3 can download music data from the music database 11 by receiving a tune list of music data stored in the music database 11 of the shared server 2, selecting a predetermined tune from within the tune list and requesting the shared server 2 for the music data of the predetermined tune.

Figure 2:
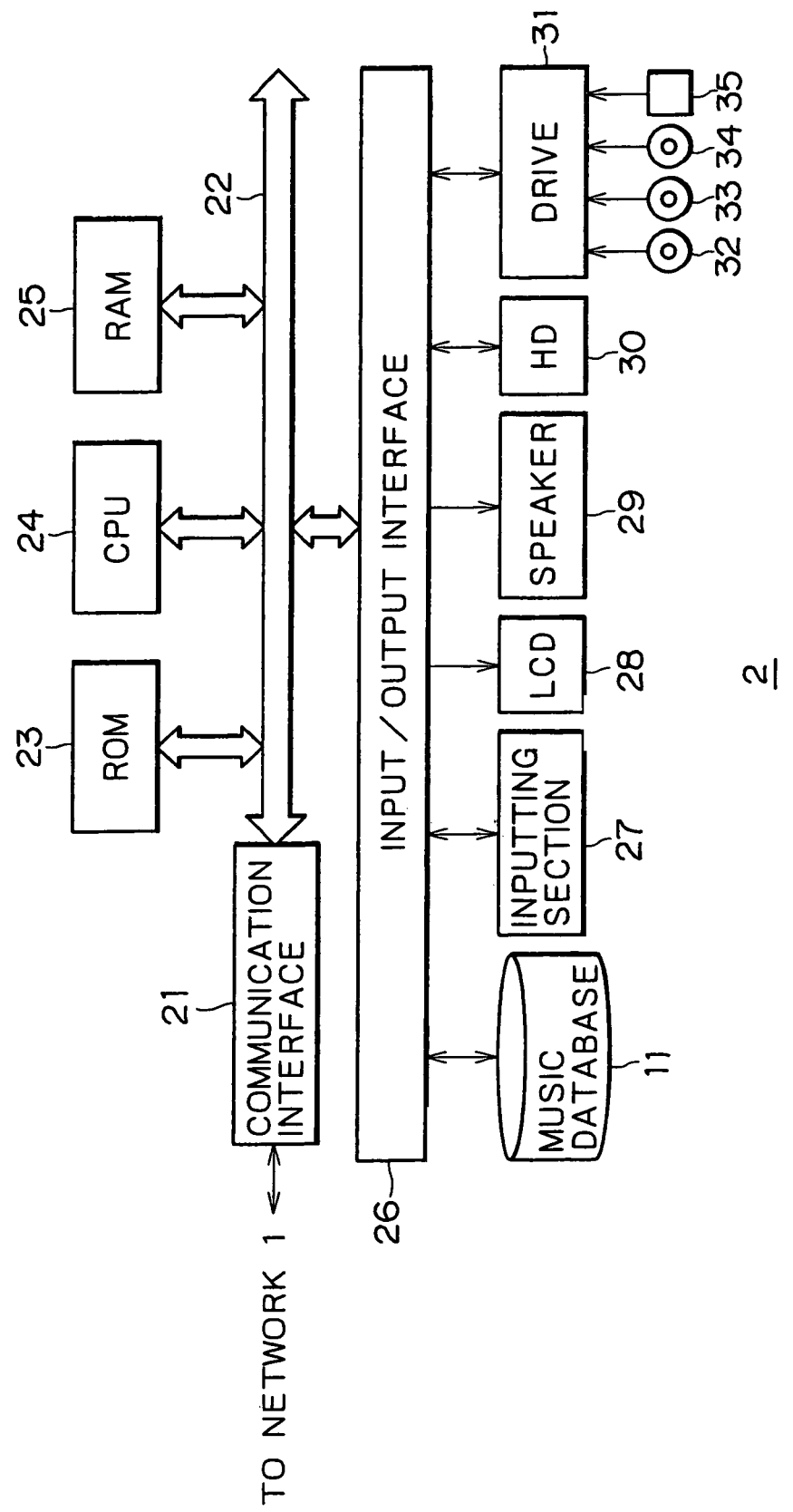
FIG. 2 is a block diagram showing an example of a construction of a possessing server shown in FIG. 1.

FIG. 2 shows an example of a construction of the shared server 2 shown in FIG. 1. Referring to FIG. 2, a communication interface 21 is an apparatus for connection, for example, to the network 1 and is formed from a modem, a terminal adapter, a network card or a like element. A read only memory (ROM) 23 stores programs to be used by a central processing unit (CPU) 24 and data and so forth which are fixed from among parameters for arithmetic operation. The CPU 24 executes various application programs and a program of a basic OS (Operating System) thereby to perform such various processes as hereinafter described. A random access memory (RAM) 25 stores a program to be executed by the CPU 24, data necessary for processing and so forth. The elements mentioned from the communication interface 21 to the RAM 25 are connected to one another by a bus 22.

Figure 3:
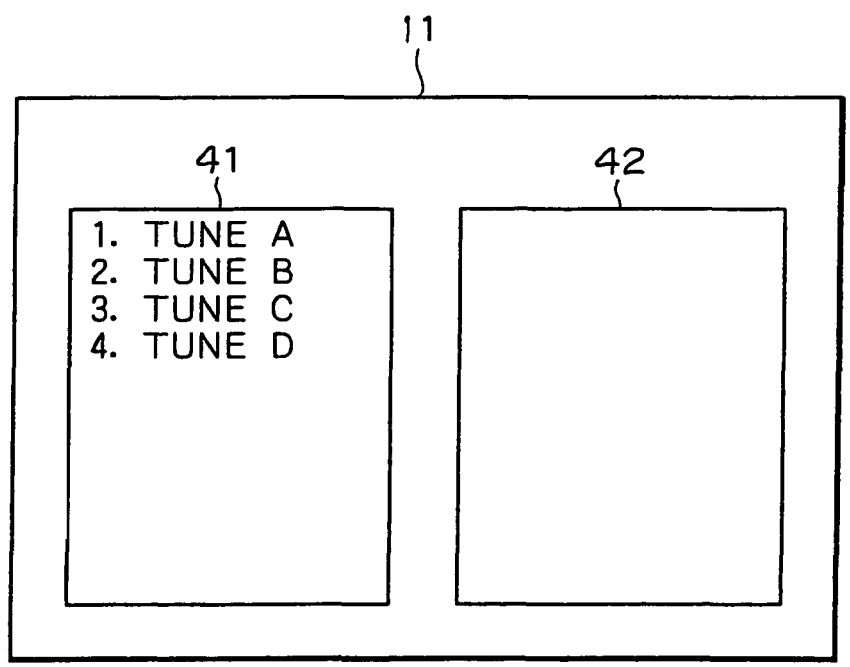
FIG. 3 is a schematic view illustrating a music database.

The music database 11 has a plurality of music data stored therein so that it may function as a jukebox server. For example, as shown in FIG. 3, a tune list 41 and tune data 42 are stored in the music database 11. The tune list 41 includes tune information such as titles, names of artists and updating dates and points to the tune data 42 (addresses indicating locations at which the tune data 42 are stored). The tune data 42 include entities (music data) of the pointers to the tune data 42 stored in the tune list 41 and are stored in the form of data compressed in accordance with the MP3 (Moving Picture Experts Group Audio Layer 3), the ATRAC (Adaptive Transform Acoustic Coding) 3 or some other suitable compression system.

Referring back to FIG. 2, an inputting section 27 is formed from, for example, a keyboard, a mouse and so forth and operated by a user to input various instructions to the CPU 24. A liquid crystal display (LCD) unit 28 displays predetermined information under the control of the CPU 24. A speaker 29 reproduces predetermined music data under the control of the CPU 24. A hard disk (HD) 30 stores, for example, the OS, the chat client program and so forth.

A drive 31 is constructed such that a magnetic disk 32, an optical disk 33, a magneto-optical disk 34 or a semiconductor memory 35 can be loaded therein.

The music database 11 and the elements mentioned above from the inputting section 27 to the drive 31 are connected to an input/output interface 26, which is in turn connected to the CPU 24 by the bus 22.

Figure 4:
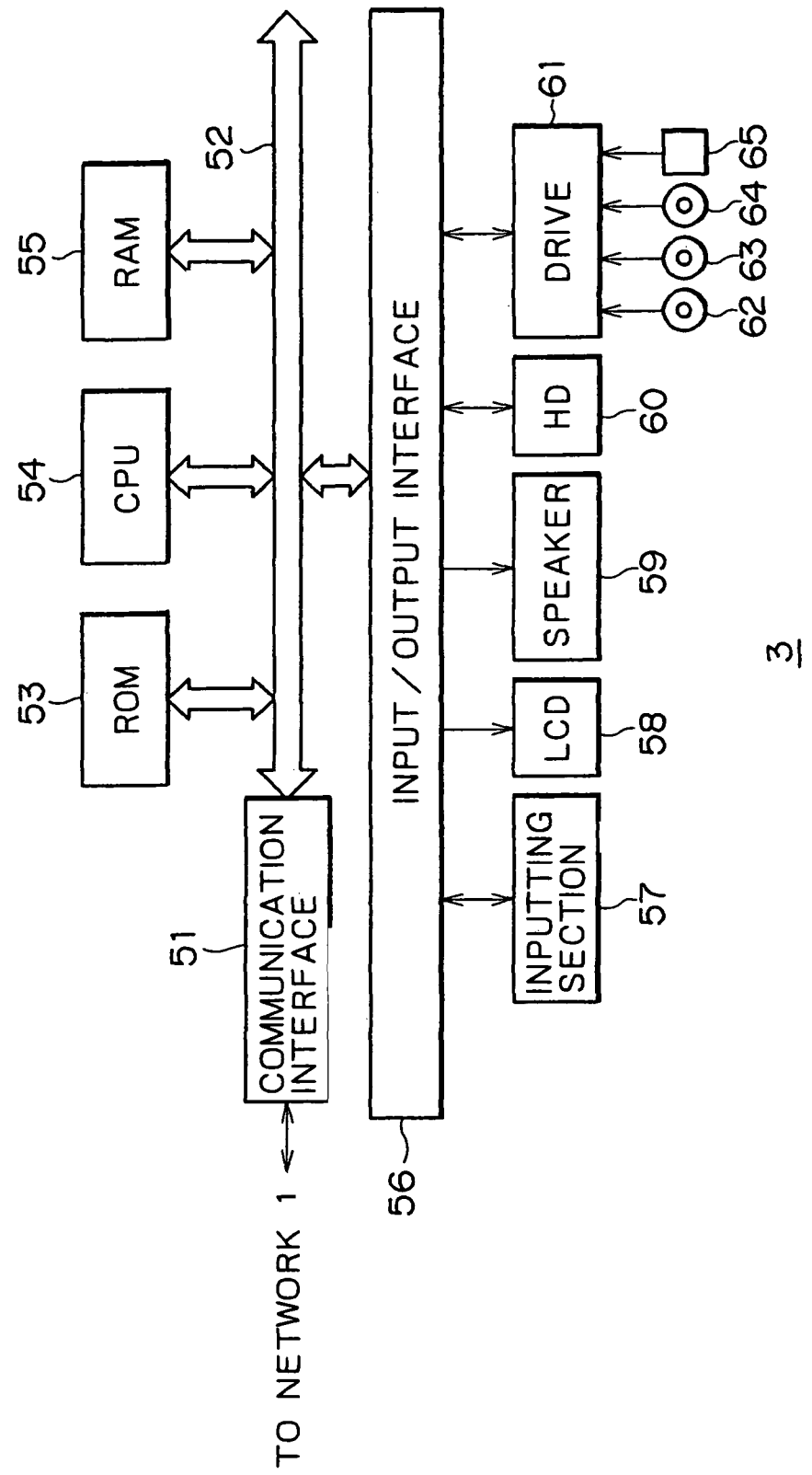
FIG. 4 is a block diagram showing an example of a construction of a client computer shown in FIG. 1.

FIG. 4 shows an example of a construction of the client computer 3 of FIG. 1. Referring to FIG. 4, the client computer 3 shown includes a communication interface 51, a bus 52, a ROM 53, a CPU 54, a RAM 55, a input/output interface 56, an inputting section 57, an LCD unit 58, a speaker 59 and a HD 60 which are similar to the elements from the communication interface 21 to the HD 30 which form the shared server 2 of FIG. 2, respectively. The client computer 3 further includes a drive 61 similar to the drive 31, and a magnetic disk 62, an optical disk 63, a magneto-optical disk 64 or a semiconductor memory 65 can be loaded into the drive 61.

Figure 5:
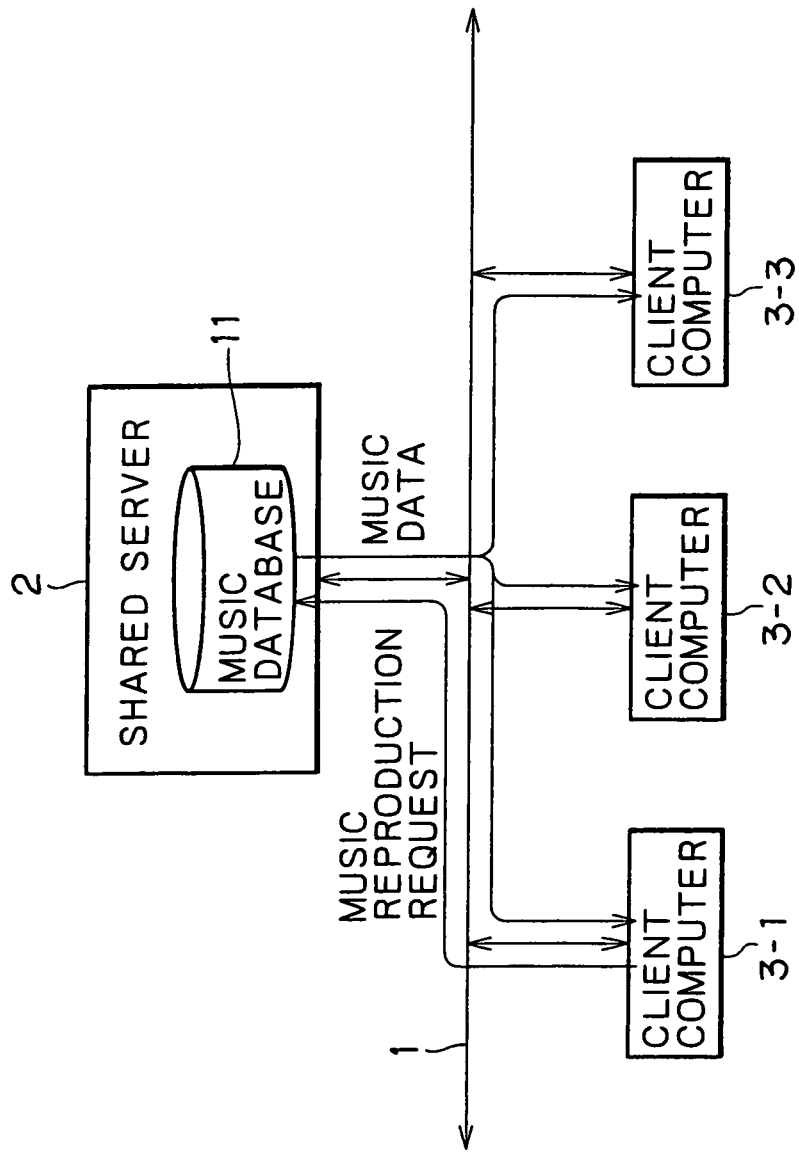
FIG. 5 is a block diagram illustrating transmission of music data in the chat system of FIG. 1.

Now, operation of the chat system of FIG. 1 when the client computer 3-1 transmits a music reproduction request to the shared server 2 and the shared server 2 receiving the request provides (transmits) music data to the client computers 3-1 to 3-3 is described with reference to FIG. 5.

It is assumed that the client computers 3-1 to 3-3 are connected to the shared server 2 over the network 1 and log in a common chat room (group) of the chat system. If the user of the client computer 3-1 operates the mouse which forms the inputting section 57 to issue a request for reproduction of a predetermined tune, then the instruction is transmitted to the shared server 2 over the network 1.

The shared server 2 receives the instruction (request) transmitted thereto, reads out music data of the request stored in the music database 11 and transmits the music data to the client computers 3-1 to 3-3. In particular, since the client computers 3-2 and 3-3 log in the common chat room with the client computer 3-1, the music data of the request from the client computer 3-1 are automatically downloaded to the client computers 3-2 and 3-3 even if the client computers 3-2 and 3-3 do not request for the music data separately.

Figure 6:
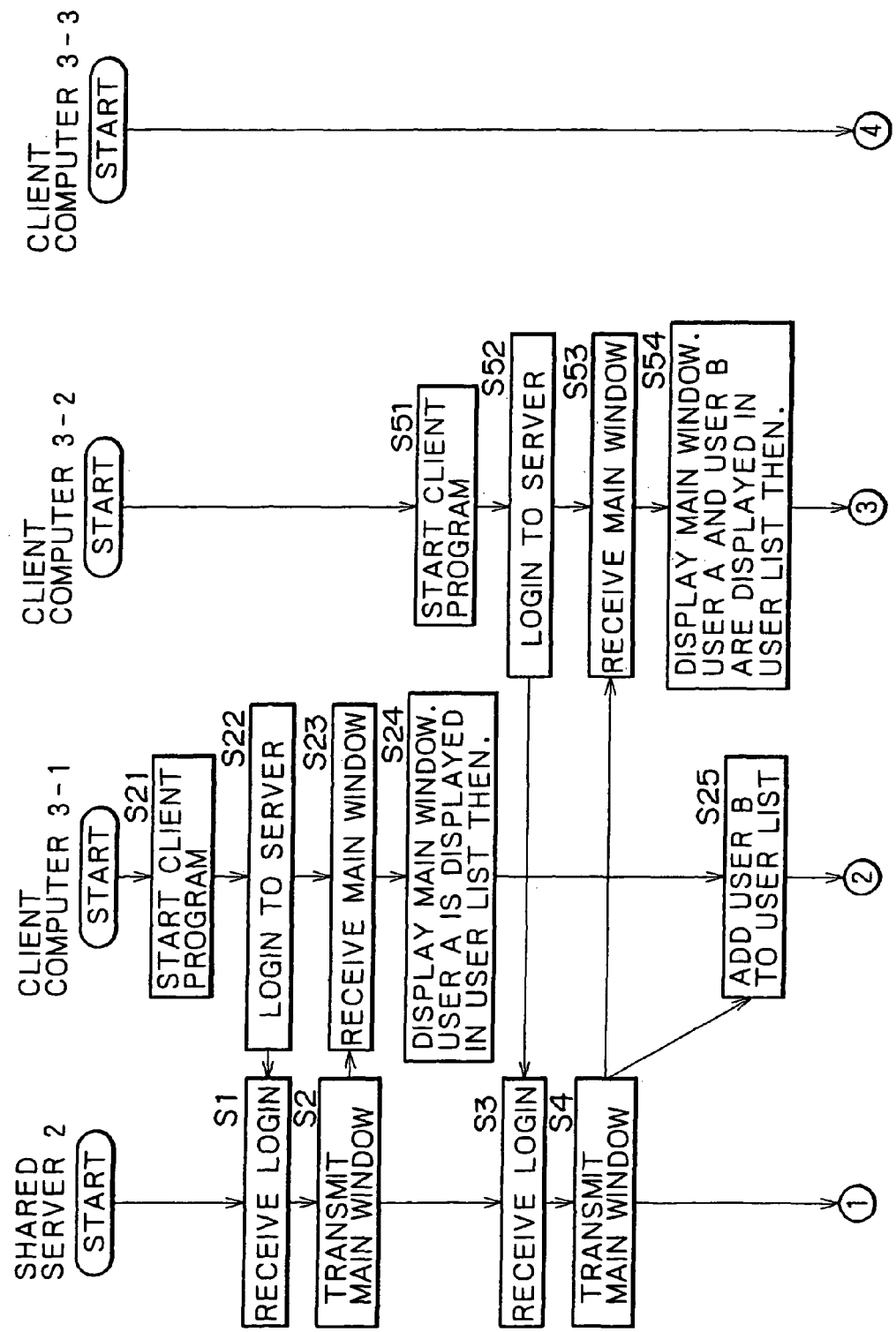
FIGS. 6 and 7 are flow charts illustrating a music data transmission and reproduction process.
Figure 7:
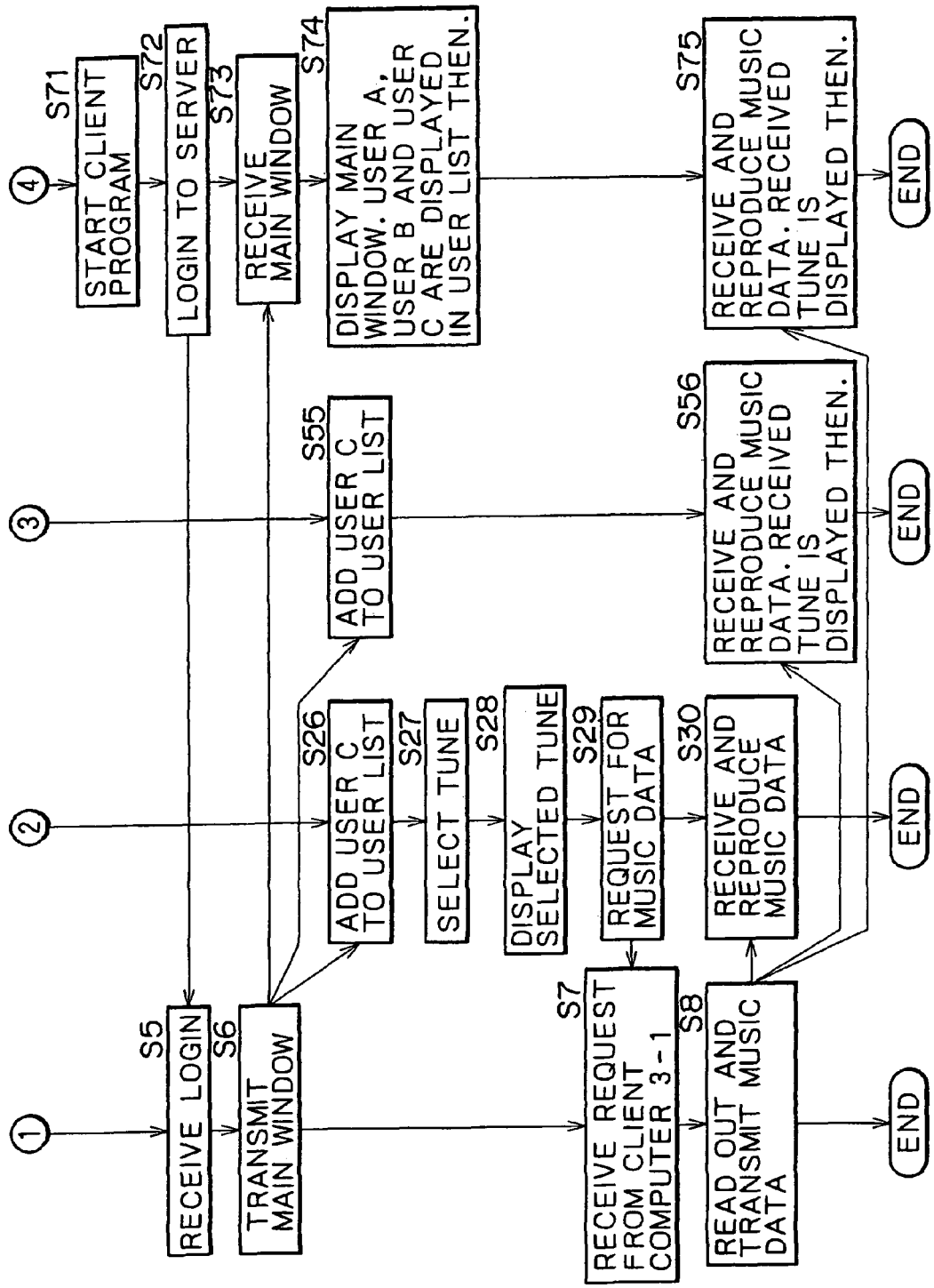

Further, a music data transmission and reproduction process executed by the shared server 2 and the client computers 3-1 to 3-3 is described with reference to FIGS. 6 and 7. It is assumed here that the user name of the client computer 3-1 is user A, the user name of the client computer 3-2 is user B, and the user name of the client computer 3-3 is user C.

Figure 8:
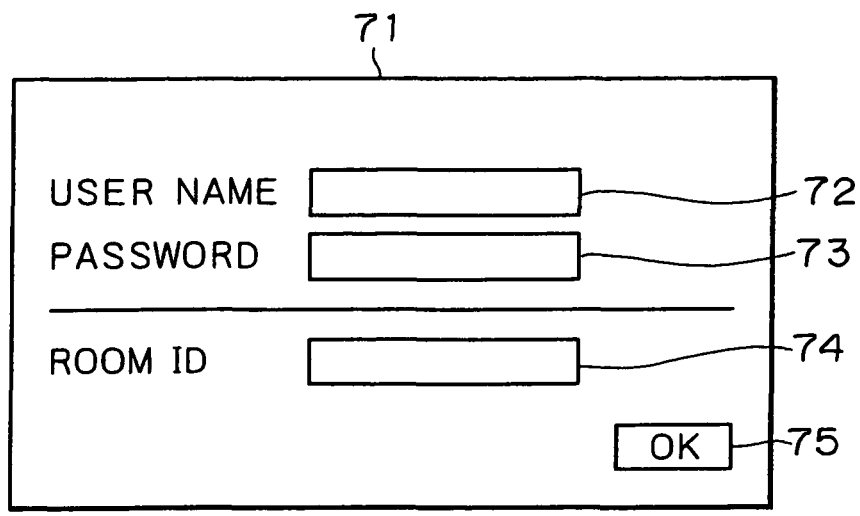
FIG. 8 is a schematic view showing a login window.

In step S21, the user A of the client computer 3-1 will operate the inputting section 57 to cause CPU 54 to start up the chat program stored on the HD 60. Consequently, the CPU 54 controls the LCD unit 58 to display, for example, such a login window 71 as shown in FIG. 8.

In step S22, the user A of the client computer 3-1 will operate the inputting section 57 to input necessary information into a user name input area 72, a password input area 73 and a room ID area 74 in the login window 71 and then click a button 75 to log in the shared server 2.

More particularly, the user A will operate the keyboard which forms the inputting section 57 to input the user name into the user name input area 72 displayed in the login window 71, input a password set in advance into the password input area 73 and input a room ID into the room ID area 74. The room ID is a room number selected by a user when the user intends to participate in a chat room.

When the button 75 is clicked by the user A after the necessary information is inputted, the information for login is transmitted to the shared server 2.

In step S1, the CPU 24 of the shared server 2 receives the login information from the client computer 3-1 and discriminates whether or not the user name and the password received are correct ones which are stored on the HD 30 in advance. If the CPU 24 discriminates that the user name and the password are not correct, then it rejects connection of the client computer 3-1. On the other hand, if the CPU 24 discriminates that the user name and the password are correct, then it connects the client computer 3-1 to the chat room (group) of the selected room ID received from the client computer 3-1. Then in step S2, the CPU 24 of the shared server 2 transmits data of such a main window 81 as shown in FIG. 9, which includes titles of tunes in the tune list 41 stored in the music database 11 and chat environment, to the client computer 3-1.

Figure 9:
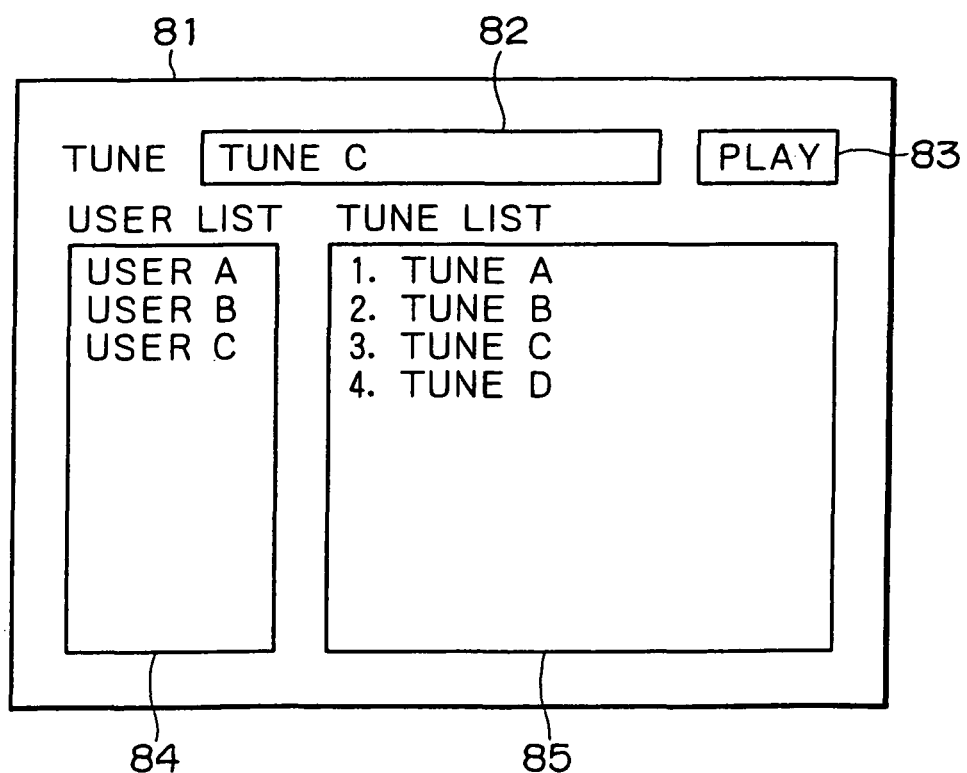
FIG. 9 is a schematic view showing a main window.

As seen in FIG. 9, user names which log in the chat room of the same room ID are displayed in a user list display area 84 of the main window 81, and the titles of the tunes stored in the tune list 41 are displayed in a tune list display area 85. Further, a tune display area 82 for displaying the title of a tune designated by a user and a button 83 for being operated by the user in order to reproduce the tune are displayed in the main window 81.

In step S23, the CPU 54 of the client computer 3-1 receives the data of the main window 81 including the tune list and the chat environment transmitted thereto from the shared server 2. In step S24, the CPU 54 of the client computer 3-1 controls the LCD unit 58 to display, for example, such a main window 81 as shown in FIG. 9. It is to be noted that, since only the user A logs in the chat room now, only the user A is displayed in the user list display area 84.

In step S51, the user B of the client computer 3-2 will operate the inputting section 57 to cause the CPU 54 to start up the chat program stored on the HD 60. In step S52, the user B of the client computer 3-2 will operate the inputting section 57 to log in the chat room of the shared server 2 having the same room number as that of the client computer 3-1.

In step S3, the CPU 24 of the shared server 2 receives the login information of the client computer 3-2, establishes connection to the client computer 3-2 and performs processing for login of the client computer 3-2. In step S4 after the processing for login is performed, the CPU 24 of the shared server 2 transmits data of the main window 81 to the client computer 3-2 and the client computer 3-1.

In step S53, the CPU 54 of the client computer 3-2 receives the data of the main window 81 transmitted thereto from the shared server 2. In step S54, the CPU 54 of the client computer 3-2 controls the LCD unit 58 to display the main window 81. At this time, the user A having logged in already and the user B who has just logged in are displayed in the user list display area 84.

At this time, the client computer 3-1 has already logged in the chat room of the same room ID of the shared server 2, and since, when another client (now, the client computer 3-2) logs in, the client computer 3-1 is notified of this from the shared server 2 by the processing in step S4, the CPU 54 of the client computer 3-1 updates the user list display area 84 of the main window 81 displayed on the LCD unit 58 with the user B (adds the user B to the user list display area 84).

In step S71, the user C of the client computer 3-3 will operate the inputting section 57 to cause the CPU 54 to start up the program stored on the HD 60. In step S72, the user C of the client computer 3-3 will operate the inputting section 57 to log in the chat room of the shared server 2 having the same room ID as that of the client computers 3-1 and 3-2.

In step S5, the CPU 24 of the shared server 2 receives the login information of the client computer 3-3, establishes connection to the client computer 3-3 and performs processing for login of the client computer 3-3. In step S6 after the processing for login is performed, the CPU 24 of the shared server 2 transmits data of the main window 81 to the client computers 3-3, 3-2 and 3-1 connected to the chat room of the same room ID.

In step S73, the CPU 54 of the client computer 3-3 receives the data of the main window 81 from the shared server 2. In step S74, the CPU 54 of the client computer 3-3 controls the LCD unit 58 to display the main window 81. At this time, the user A and the user B having already logged in and the user C who has just logged in are displayed in the user list display area 84.

At this time, based on the notification by the processing in step S6 of the shared server 2, the CPU 54 of the client computer 3-1 updates the user list display area 84 of the main window 81 displayed on the LCD unit 58 in step S26 with the user C. Similarly, the CPU 54 of the client computer 3-2 updates the user list display area 84 of the main window 81 displayed on the LCD unit 58 in step S55 with the user C.

It is to be noted that, whereas the processing when the client computers 3-1 to 3-3 successively log in the shared server 2 is described above, naturally they may otherwise perform login processing simultaneously.

Then in step S27, the user A of the client computer 3-1 will operate the mouse of the inputting section 57 to double click a predetermined tune from among the tunes displayed in the tune list display area 85 of the main window 81 of FIG. 9 to select the tune as an object of a request. It is assumed that the tune C is selected now.

In step S28, the CPU 54 of the client computer 3-1 controls the LCD unit 58 to display the title of the tune selected in step S57 in the tune display area 82 of the main window 81 displayed on the LCD unit 58 (now, the title of the tune C is displayed). Then in step S29, the user A of the client computer 3-1 will operate the mouse of the inputting section 57 to click the button 83 to transmit a request for music data of the tune to the shared server 2.

In step S7, the CPU 24 of the shared server 2 receives the request for the music data transmitted thereto from the client computer 3-1. In step S8, the CPU 24 of the shared server 2 reads out the music data of the tune (now, the tune C) of the request stored in the music database 11 and transmits the tune data to all of the client computers (in the present case, the client computers 3-1 to 3-3) connected to the chat room of the same room ID.

In step S30, the CPU 54 of the client computer 3-1 receives the music data transmitted thereto from the shared server 2 and outputs the music data to the speaker 59 so that the music data are reproduced by the speaker 59. At this time, the title of the received tune C is displayed in the tune display area 82 of the main window 81 displayed on the LCD unit 58.

Simultaneously, in steps S56 and S75, the client computers 3-2 and 3-3 receive the music data transmitted thereto from the shared server 2 and output the music data to the speaker 59 so that the music data are reproduced by the speaker 59. At this time, the title of the received tune C is displayed in the tune display area 82 of the main window 81 displayed on the LCD unit 58.

In this manner, where a plurality of client computers 3 log in the same chat room of the chat system, music data of a request issued from one of the users of the client computers 3 can be reproduced simultaneously by the plurality of users.

Figure 10:
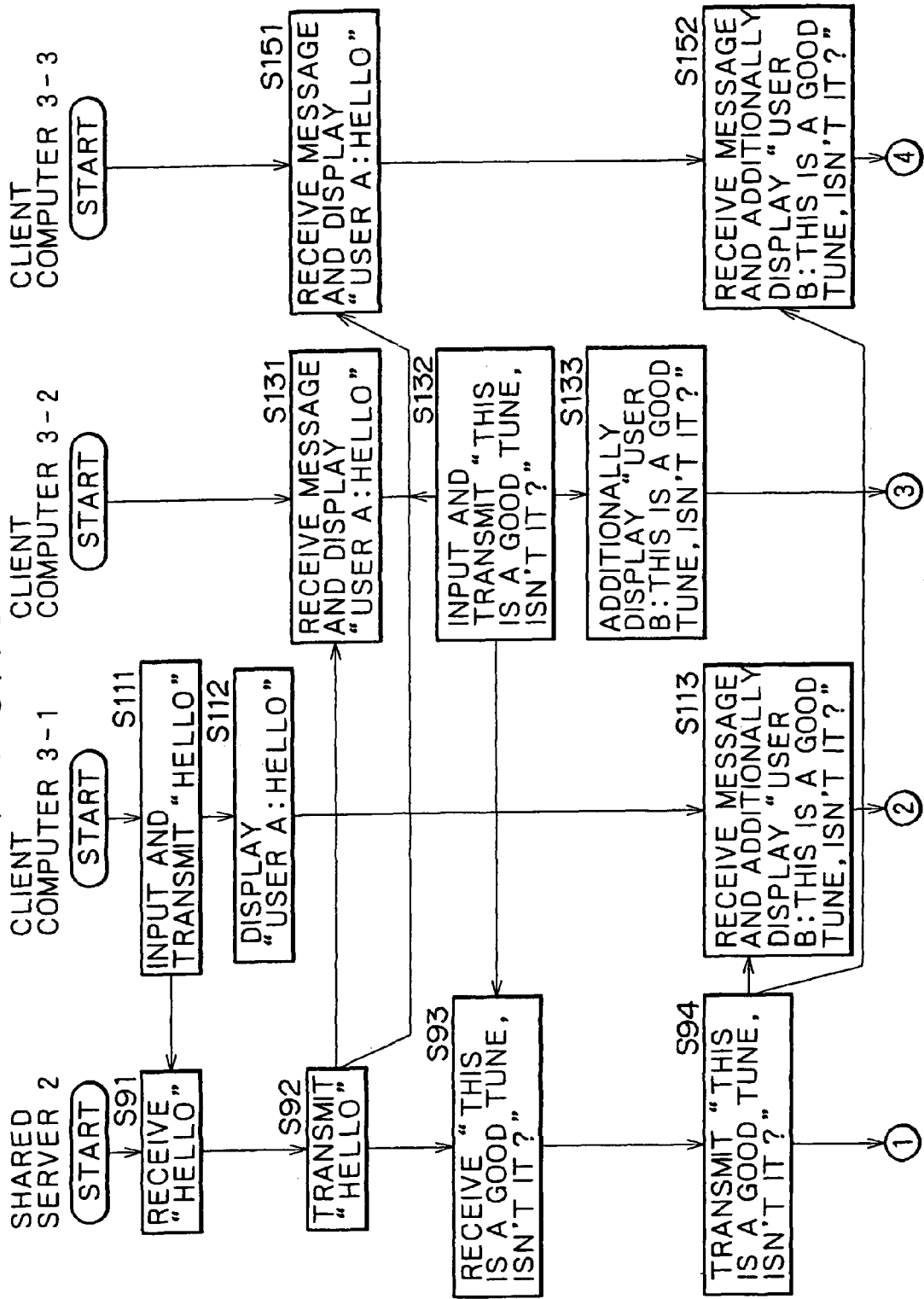
FIGS. 10 and 11 are flow charts illustrating a chat server process.
Figure 11:
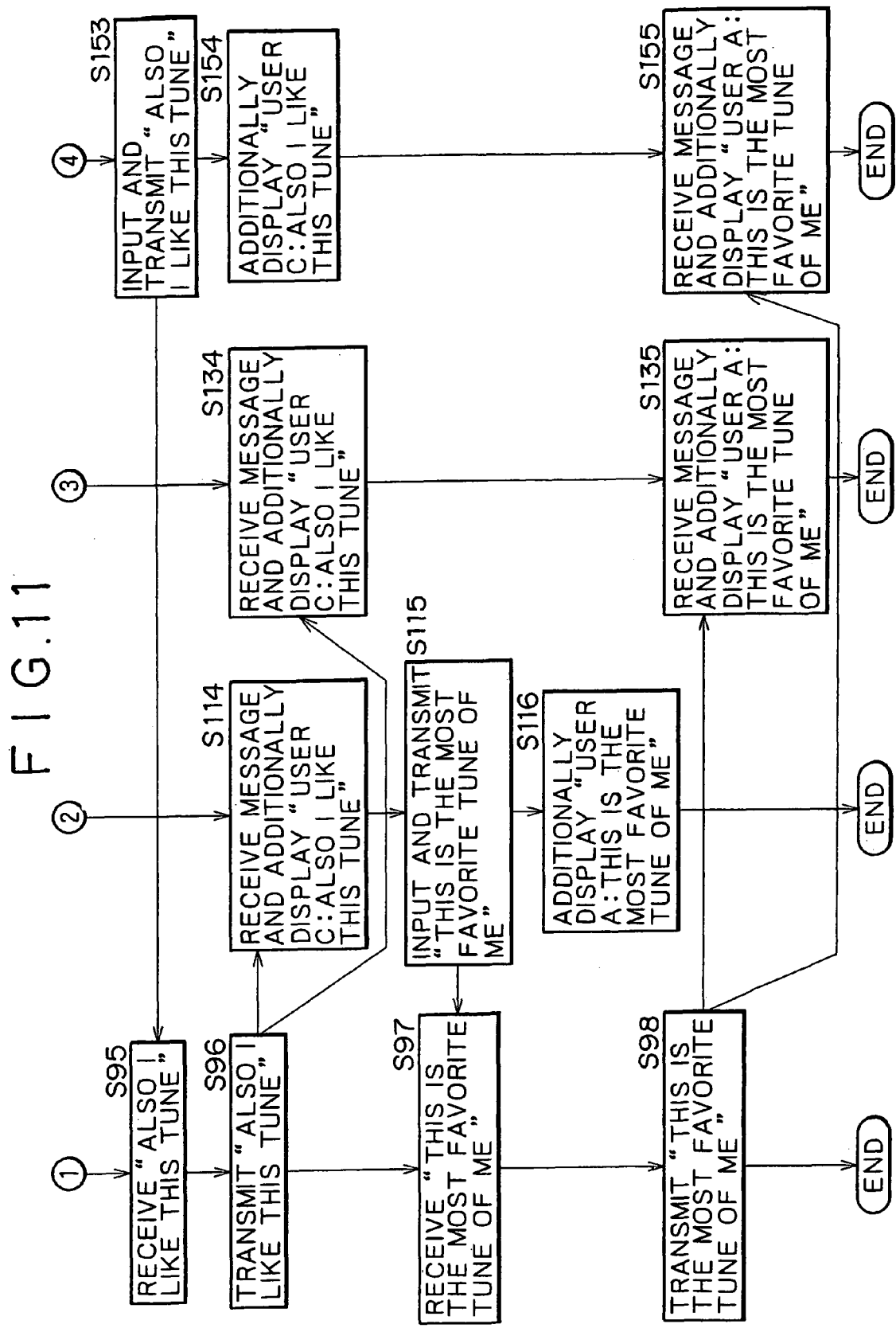

Subsequently, a chat server process which is performed by the shared server 2 is described with reference to flow charts of FIGS. 10 and 11. It is to be noted that the client computers 3-1 to 3-3 are in a state wherein they have already executed the music data transmission and reproduction process described above with reference to FIGS. 6 and 7. In other words, the following processing is executed continuously to the processing described above. Accordingly, such chat windows 91-1 to 91-3 shown in FIGS. 12 to 14 are displayed on the LCD units 58 of the client computers 3-1 to 3-3, respectively. It is to be noted that, while each of the chat windows 91-1 to 91-3 has a chat text display area 92-1, 92-2 or 92-3, a chat text input area 93-1, 93-2 or 93-3 and a button 94-1, 94-2 or 94-3, no message is displayed in the chat text display area 92-1, 92-2 or 92-3 or the chat text input area 93-1, 93-2 or 93-3 as yet.

In step S111, the user A of the client computer 3-1 will operate the inputting section 57 to input a message "Hello." into the chat text input area 93-1 of the chat window 91-1 displayed on the LCD unit 58 as shown in FIG. 12. Then, the user A will click the button 94-1 to cause the CPU 54 to transmit the message "Hello." to the shared server 2. In step S112, the CPU 54 of the client computer 3-1 controls the LCD unit 58 to display "User A: Hello." in the chat text display area 92-1 of the chat window 91-1.

In step S91, the CPU 24 of the shared server 2 receives the message "Hello." transmitted thereto from the client computer 3-1. In step S92, the CPU 24 of the shared server 2 transmits the message "Hello." to the client computers 3-2 and 3-3.

In step S131, the client computer 3-2 receives the message transmitted thereto from the shared server 2 and controls the LCD unit 58 to display "User A: Hello." in the chat text display area 92-2 of the chat window 91-2 displayed on the LCD unit 58 as shown in FIG. 13. Similarly, in step S151, the client computer 3-3 receives the message transmitted thereto from the shared server 2 and controls the LCD unit 58 to display "User A: Hello." in the chat text display area 92-3 of the chat window 91-3 displayed on the LCD unit 58 as shown in FIG. 14.

In step S132, the user B of the client computer 3-2 will operate the inputting section 57 to input a message "This is a good tune, isn't it?" into the chat text input area 93-2 of the chat window 91-2 displayed on the LCD unit 58 as shown in FIG. 13. Then, the user B will click the button 94-2 to cause the CPU 54 to transmit the message "This is a good tune, isn't it?" to the shared server 2. In step S133, the CPU 54 of the client computer 3-2 controls the LCD unit 58 to display "User B: This is a good tune, isn't it?" in the chat text display area 92-2 of the chat window 91-2 displayed on the LCD unit 58.

In step S93, the CPU 24 of the shared server 2 receives the message "This is a good tune, isn't it?" transmitted thereto from the client computer 3-2. In step S94, the CPU 24 of the shared server 2 transmits the message "This is a good tune, isn't it?" to the client computers 3-1 and 3-3.

In step S113, the client computer 3-1 receives the message transmitted thereto from the shared server 2 and causes the LCD unit 58 to display "User B: This is a good tune, isn't it?" in the chat text display area 92-1 of the chat window 91-1 displayed on the LCD unit 58 as shown in FIG. 15. Similarly, in step S152, the client computer 3-3 receives the message transmitted thereto from the shared server 2 and causes the LCD unit 58 to display "User B: This is a good tune, isn't it?" in the chat text display area 92-3 of the chat window 91-3 displayed on the LCD unit 58 as shown in FIG. 14.

In step S153, the user C of the client computer 3-3 will operate the inputting section 57 to input a message "Also I like this tune." in the chat text input area 93-3 of the chat window 91-3 displayed on the LCD unit 58 as shown in FIG. 14. Then, the user C will click the button 94-3 to cause the CPU 54 to transmit the message "Also I like this tune." to the shared server 2. In step S154, the CPU 54 of the client computer 3-3 causes the LCD unit 58 to display "User C: Also I like this tune." in the chat text display area 92-3 of the chat window 91-3 displayed on the LCD unit 58.

In step S95, the CPU 24 of the shared server 2 receives the message "Also I like this tune." transmitted thereto from the client computer 3-3. In step S96, the CPU 24 of the shared server 2 transmits the message "Also I like this tune." to the client computers 3-1 and 3-2.

In step S114, the client computer 3-1 receives the message transmitted thereto from the shared server 2 and causes the LCD unit 58 to display "User C: Also I like this tune." in the chat text display area 92-1 of the chat window 91-1 displayed on the LCD unit 58 as shown in FIG. 15. Similarly, in step S134, the client computer 3-2 receives the message transmitted thereto from the shared server 2 and causes the LCD unit 58 to display "User C: Also I like this tune." in the chat text display area 92-2 of the chat window 91-2 displayed on the LCD unit 58 (not shown).

In step S115, the user A of the client computer 3-1 will operate the inputting section 57 to input a message "This is the most favorite tune of me." into the chat text input area 93-1 of the chat window 91-1 displayed on the LCD unit 58 as shown in FIG. 15. Then, the user A will click the button 94-1 to cause the CPU 54 to transmit the message "This is the most favorite tune of me." to the shared server 2. In step S116, the CPU 54 of the client computer 3-1 controls the LCD unit 58 to display "User A: This is the most favorite tune of me." in the chat text display area 92-1 of the chat window 91-1 (FIG. 15).

In step S97, the CPU 24 of the shared server 2 receives the message "This is the most favorite tune of me." transmitted thereto from the client computer 3-1. In step S98, the CPU 24 of the shared server 2 transmits the message "This is the most favorite tune of me." to the client computers 3-2 and 3-3.

In step S135, the client computer 3-2 receives the message transmitted thereto from the shared server 2 and causes the LCD unit 58 to display "User A: This is the most favorite tune of me." in the chat text display area 92-2 of the chat window 91-2 displayed on the LCD unit 58 (not shown). Similarly, in step S155, the client computer 3-3 receives the message transmitted thereto from the shared server 2 and causes the LCD unit 58 to display "User A: This is the most favorite tune of me." in the chat text display area 92-3 of the chat window 91-3 displayed on the LCD unit 58 (not shown).

In this manner, a plurality of clients who log in the same chat room of the chat system not only can enjoy conversation by texts but also can enjoy music data of a request from one of the clients simultaneously while they are communicating with one another.

While the shared server 2 in the embodiment described above is described as an independent apparatus, alternatively the function of it may be incorporated in the client computer 3.

Also it is possible, for example, to use the shared server 2 described above as a voice message server of an automatic answering telephone set such that voice messages recorded in the shared server 2 are shared by a secretary and its superior, who are at remote places from each other, using a personal computer and the secretary selects only significant messages from among the voice messages stored in the automatic answering telephone set and conveys the selected messages to the superior at the remote place through the personal computer.

Further, the present invention may be applied to a music data distribution service of a wire broadcasting request or the like, or the music data stored in the music database 11 may be reproduced as background music (BGM).

Furthermore, while the present invention has been described in connection with an example wherein it is applied to a personal computer, it can be applied not only to a personal computer but also to chat software having a music reproduction function or any information processing apparatus which can be connected to a network.

While the series of processes described above can be executed by hardware, it may otherwise be executed by software. Where the series of processes is executed by software, a program which constructs the software is installed from a program storage medium into a computer (the CPU 24 of FIG. 2 or the CPU 54 of FIG. 4) incorporated in hardware for exclusive use or, for example, a personal computer for universal use which can execute various functions by installing various programs.

The program storage medium in which a program which is installed into a computer so that it can be executed by the computer may be a package medium such as the magnetic disk 32 or 62 (including a floppy disk), the optical disk 33 or 63 (including a CD-ROM (Compact Disk-Read Only memory) and a DVD (Digital Versatile Disk)), the magneto-optical disk 34 or 64 (including an MD (Mini-Disc)) or the semiconductor memory 35 or 65 as shown in FIG. 2 or 4 or the HD 30 or 60 on which the program is stored temporarily or permanently. Storage of the program onto the program storage medium is performed making use of a wired or wireless communication medium such as a local area network, the Internet or a digital satellite broadcast through an interface such as a router or a modem when necessary.

It is to be noted that, in the present application, the steps which describe the program provided in the form of a medium may be but need not necessarily be processed in a time series in the order as described, and include processes which are executed parallelly or individually.

Further, the term "system" in the present specification is used to represent an entire apparatus which includes a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. A content data sharing system having a plurality of devices operably linked to a network, each device comprising:
   a storage unit configured to store shared tunes and tune data corresponding to each of the available tunes, the tune data including a title, an artist name and an updating date;
   a communication unit configured
   to transmit an item list of the shared tunes to one of other devices determined as being currently connected to the network and eligible for tunes sharing, and
   to receive a request for the shared tunes that selects an item from the item list of the shared tunes from the one of the other devices; and
   a control unit, implemented by a central processing unit and configured to control said communication unit to directly stream the shared tunes requested from the one of the other devices in direct response to receiving the request for the shared tunes from the one of the other devices;
   wherein
   said communication unit is configured
   to receive an other item list of the shared tunes from one of the other devices,
   to transmit the request for the shared tunes corresponding to an item selected from the other item list of the shared tunes to one of the other devices, and
   to receive the shared tunes directly streamed from one of the other devices,
   wherein each device of the plurality of devices further comprises a display unit configured to display the other item list of the shared tunes and a device list of the other devices determined as being currently connected to the network and eligible for tunes sharing,
   wherein each device of the plurality of devices further comprises a reproducing control unit configured to control reproducing of the shared tunes while the communication unit is receiving the shared tunes, and
   wherein the eligible other devices belong to a predetermined group operably linked to the network.

2. The content data sharing system according to claim 1, wherein
   the communication unit transmits the item list of the shared tunes to the one of the other devices when the password provided by the one of the other devices is correct.

3. A non-transitory computer-readable program storage medium including computer program instructions that cause a device to implement a method of sharing tunes between a plurality of devices connected via a network, the method comprising:
   storing, at a server, shared tunes and tune data corresponding to each of the available tunes, the tune data including a title, an artist name and an updating date;
   displaying an item list of the shared tunes and a device list of other devices determined as being currently connected to the network and eligible for tunes sharing;
   transmitting the item list of shared tunes from the server to one of the other devices determined as being currently connected to the network and eligible for tunes sharing;
   receiving request for the shared tunes that selects an item from the item list of the shared tunes from the one of the eligible other devices; and
   directly providing the shared tunes from the server to the one of the eligible other devices in direct response to receiving the request for the shared tunes from the one of the eligible other devices,
   wherein the plurality of devices belong to a predetermined group operably linked to the network.

4. The non-transitory computer readable program storage medium according to claim 3, further comprising:
   judging whether authentication information provided by the one of the eligible other devices is acceptable.

5. A portable device for sharing multi-media tunes with other devices connected via a network comprising:
   a storage unit configured to store shared tunes and tune data corresponding to each of the available tunes, the tune data including a title, an artist name and an updating date;
   a display unit configured to display an item list of the shared tunes and a device list of the other devices determined as being currently connected to the network and eligible for tunes sharing;
   a communication unit configured
   to transmit the item list of the shared tunes to one of the other devices determined as being currently connected to the network and eligible for tunes sharing, and
   to receive a request for the shared tunes that selects an item from the item list of the shared tunes from the one of the eligible other devices; and
   a control unit, implemented by a central processing unit and configured to control said communication unit to directly stream the shared tunes to the one of the eligible other devices in direct response to receiving the request for the shared tunes from the one of the eligible other devices,
   wherein the portable device and the eligible other devices both belong to a predetermined group operably linked to the network.

6. The portable device according to claim 5, wherein
   said control unit judges whether a password provided by the one of the eligible other devices is correct;
   wherein the communication unit transmits the item list of the shared tunes to the one of the eligible other devices when the password is correct.

7. The portable device according to claim 5, further comprising:
   a reproducing control unit configured to control reproduction of the shared tunes.

8. A portable device for sharing multi-media tunes with other devices connected via a network comprising:
   a memory configured to store shared tunes and tune data corresponding to each of the available tunes, the tune data including a title, an artist name and an updating date;
   means for displaying an item list of the shared tunes and a device list of the other devices determined as being currently connected to the network and eligible for tunes sharing;
   means for transmitting the item list of the shared tunes to one of the eligible other devices;
   means for receiving a request for the shared tunes that selects an item from the item list of the shared tunes from the one of the eligible other devices; and means for directly streaming the shared tunes requested from the one of the eligible other devices to the one of the eligible other devices in direct response to receiving the request for the shared tunes from the one of the eligible other devices, wherein the portable device and the eligible other devices both belong to a predetermined group operably linked to the network.

9. The content data sharing system according to claim 1, wherein, when the one of the eligible other devices requests shared tunes corresponding to an item selected from the item list of shared tunes, the communication unit simultaneously streams the shared tunes to each of the eligible other devices.

10. The content data sharing system according to claim 1, wherein
the devices each further comprises:
an operation unit configured to select the device in the device list based on a user input.

11. The content data sharing system according to claim 1, wherein
the display updates the device list when another eligible device connects to the network.

12. An eligible device connected to a server, the eligible device comprising:
a storage unit configured to store shared tunes and tune data corresponding to each of the available tunes, the tune data including a title, an artist name and an updating date;
a communication unit configured
to receive an item list of shared tunes from the server;
to transmit a request for the shared tunes that selects an item from the item list to the server, and
to receive the shared tunes streamed directly from the server, the shared tunes streamed directly from the server in direct response to the server receiving the request for the shared tunes; and
a display unit configured to display the item list of the shared tunes and a device list of the server determined as being currently connected to the network and eligible for tunes sharing;
a reproducing control unit, implemented by a central processing unit and configured to control reproducing of the shared tunes while the communication unit is receiving the shared tunes,
wherein the server and the eligible device both belong to a predetermined group operably linked to the network.

13. The content data sharing system according to claim 1, wherein each device actively sets to share tunes in the device list.

14. The content data sharing system according to claim 1, wherein the display unit displays a title of the reproduced streaming tunes.

15. The non-transitory computer readable program storage medium according to claim 3, wherein the displaying further displays a title of the reproduced streaming tunes.

16. The non-transitory computer readable program storage medium according to claim 3, wherein in the transmitting the item list of the shared tunes is transmitted to the one of the eligible other devices when a password provided by the one of the eligible other devices is correct.

17. The non-transitory computer readable program storage medium according to claim 3, wherein the transmitting is performed in response to a selection of the server by the one of the eligible other devices based on a user input.

18. The non-transitory computer readable program storage medium according to claim 3, further comprising updating the device list when another eligible device connects to the network.

19. The portable device according to claim 5, wherein the display unit displays a title of the reproduced streaming tunes.

20. The portable device according to claim 5, wherein the display unit displays, in an information list, information about the eligible other devices currently connected to the network.

21. The portable device according to claim 5, wherein the communication unit transmits the item list of the shared tunes to the one of the eligible other devices when a password provided by the one of the eligible other devices is correct.

22. The portable device according to claim 5, wherein the communication unit transmits the item list in response to a selection of the portable device by the one of the eligible other devices based on a user input.

23. The portable device according to claim 5, wherein the display unit updates the device list when another eligible other device connects to the network.

24. The eligible device according to claim 12, wherein the display unit displays a title of the reproduced streaming tunes.

25. The eligible device according to claim 12, wherein the communication unit receives the item list of the shared tunes when a password provided to the server is correct.

26. The eligible device according to claim 12, wherein the communication unit selects the server based on a user input.

27. The eligible device according to claim 12, wherein the display unit updates the device list when another eligible other device connects to the network.

28. The content data sharing system according to claim 1, wherein
the item list of the shared tunes includes each item of shared tunes available for direct streaming from the device.

* * * * *

UNITED STATES PATENT AND TRADEMARK OFFICE
CERTIFICATE OF CORRECTION

Page 1 of 1

PATENT NO. : 8,626,938 B2
APPLICATION NO. : 11/302171
DATED : January 7, 2014
INVENTOR(S) : Tsunetake Noma It is certified that error appears in the above-identified patent and that said Letters Patent is hereby corrected as shown below:

On the title page, Item (54) and in the Specification, Column 1, the Title is incorrect. Item (54) and Column 1 should read:

--SERVICE PROVIDING APPARATUS AND METHOD, AND INFORMATION PROCESSING APPARATUS AND METHOD AS WELL AS PROGRAM STORAGE MEDIUM--

On the title page, the Item (62), the Related U.S. Application Data Information is incorrect. Item (62) should read:

Related U.S. Application Data

--(62) Division of application No. 09/684,063, filed on Oct. 6, 2000--

Signed and Sealed this
Twenty-ninth Day of April, 2014

Michelle K. Lee
*Deputy Director of the United States Patent and Trademark Office*